Jan. 9, 1962  C. J. STEIGERWALD  3,016,431
EXPLOSION PROOF ENCLOSURE FOR MOTOR
STARTERS AND CIRCUIT BREAKERS
Filed July 15, 1960  3 Sheets-Sheet 1

Inventor
Carl J. Steigerwald

Jan. 9, 1962 C. J. STEIGERWALD 3,016,431
EXPLOSION PROOF ENCLOSURE FOR MOTOR
STARTERS AND CIRCUIT BREAKERS
Filed July 15, 1960 3 Sheets-Sheet 3
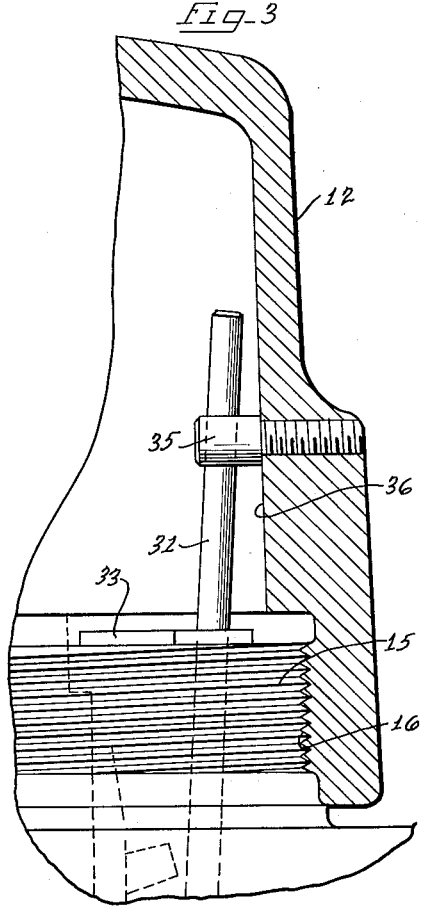
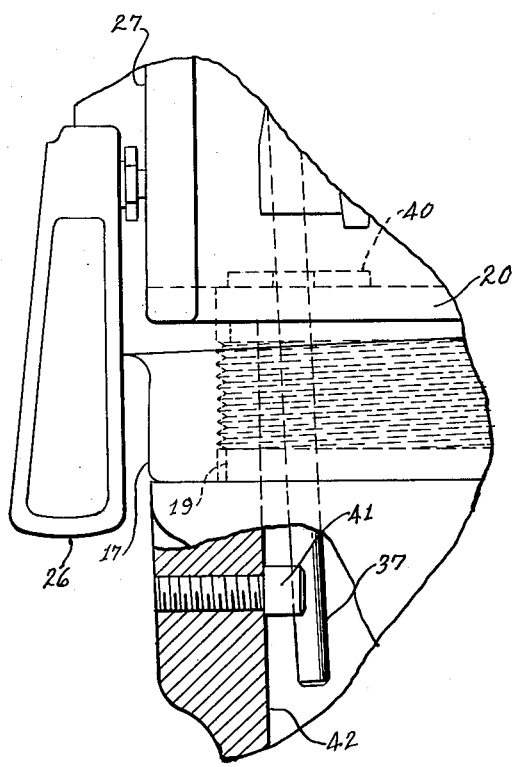
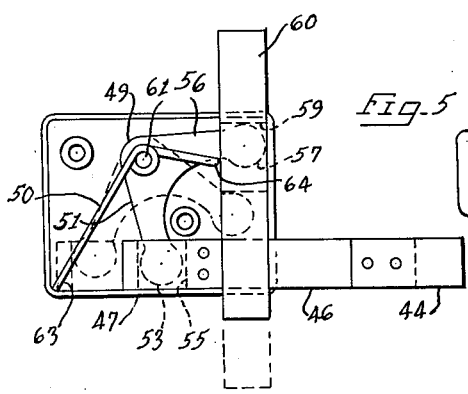
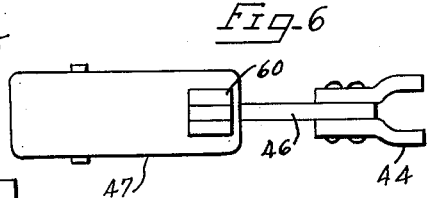
Inventor
Carl J. Steigerwald
by Hill, Sherman, Meroni, Gross & Simpson Attys.

3,016,431
EXPLOSION PROOF ENCLOSURE FOR MOTOR STARTERS AND CIRCUIT BREAKERS
Carl J. Steigerwald, Chicago, Ill., assignor to The Pyle-National Company, Chicago, Ill., a corporation of New Jersey
Filed July 15, 1960, Ser. No. 43,018
5 Claims. (Cl. 200—50)

This invention relates to explosion proof enclosures for electrical control devices, such as motor starters and circuit breakers, and more particularly relates to an improved interlocking means therefor.

A principal object of the invention is to provide an improved form of interlock for explosion proof enclosures, so arranged as to prevent operation of electrical control devices within the enclosure, except when the enclosure is in an explosion proof condition.

A further object of the invention is to provide an interlock for electrical control devices enclosed within an explosion proof enclosure and operated by a control member on the outside of the enclosure, so arranged as to prevent movement of the control member to an "on" position, except when the enclosure is in a safe condition.

Still another object of the invention is to provide an interlock for electrical control devices enclosed within an enclosure, having removable end portions in which the end portions of the enclosure are locked from removal when the electrical control devices are energized, and in which the electrical control devices are prevented from being energized, except when the end closure members of the enclosure are in a closed condition on the enclosure.

Still another object of the invention is to provide a simple and improved form of interlock for electrical control devices enclosed within an explosion proof enclosure having at least one end closure member removably mounted thereon, and a control member on the outside of the enclosure movable to "on" and "off" positions, together with interlocking means cooperating with control member and operated upon removal of the end closure member from the enclosure, to prevent operation of the control member except when tthe end closure member is in a closed condition on the enclosure, and preventing removal of the end closure member from the enclosure when the control member is in an "on" position.

These and other objects of the invention will appear from time to time as the following specification proceeds and with reference to the accompanying drawings wherein:

FIGURE 3 is an enlarged fragmentary partial sectional view showing the interlock for the upper closure member in a locked position;

FIGURE 4 is an enlarged fragmentary view showing the lower closure member in a locked position;

FIGURE 5 is an enlarged detail view showing the interlock for preventing operation of the control devices contained within the enclosure, except when the closure members for the enclosure are in closed positions; and FIGURE 6 is a plan view of the interlock shown in FIGURE 5.

Figure 1:
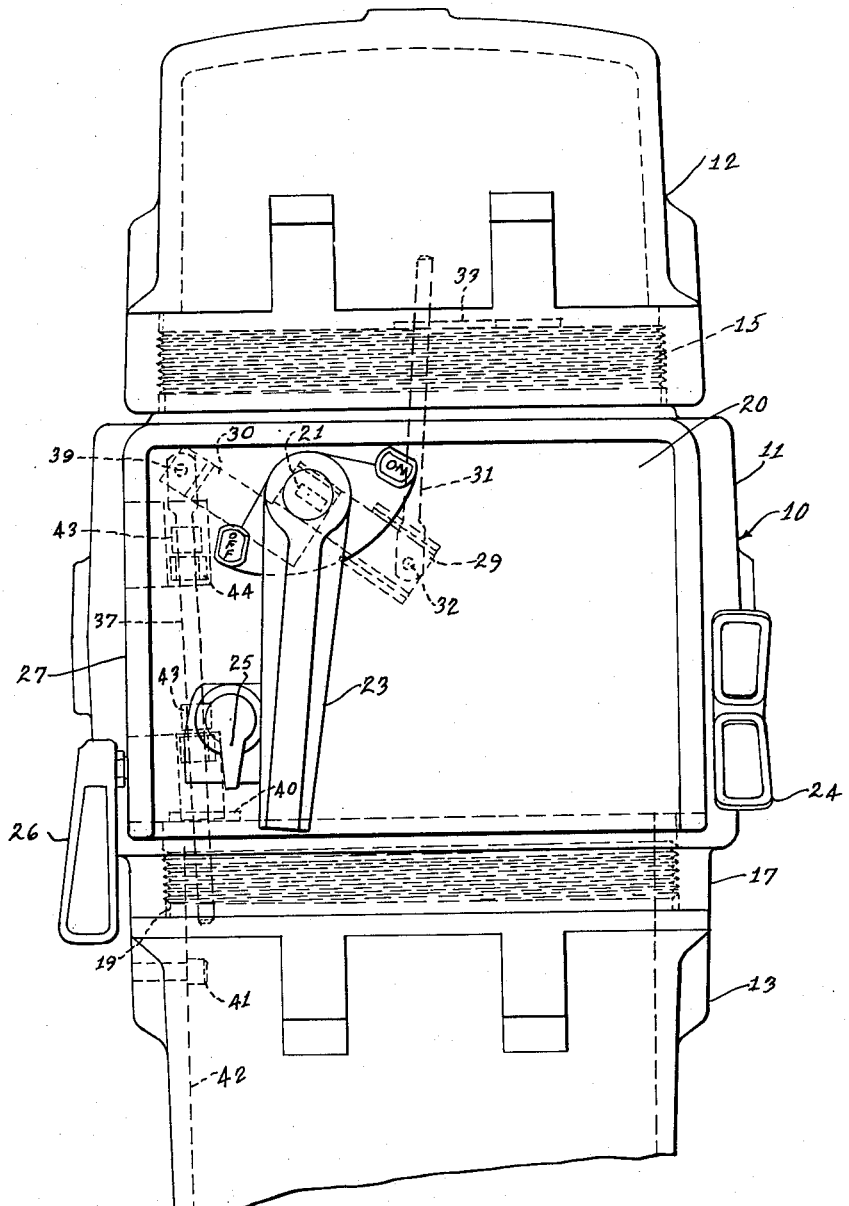
FIGURE 1 is an end view of an explosion proof enclosure constructed in accordance with the invention, with the bottom portion of the lower closure member for the enclosure broken away.
Figure 2:
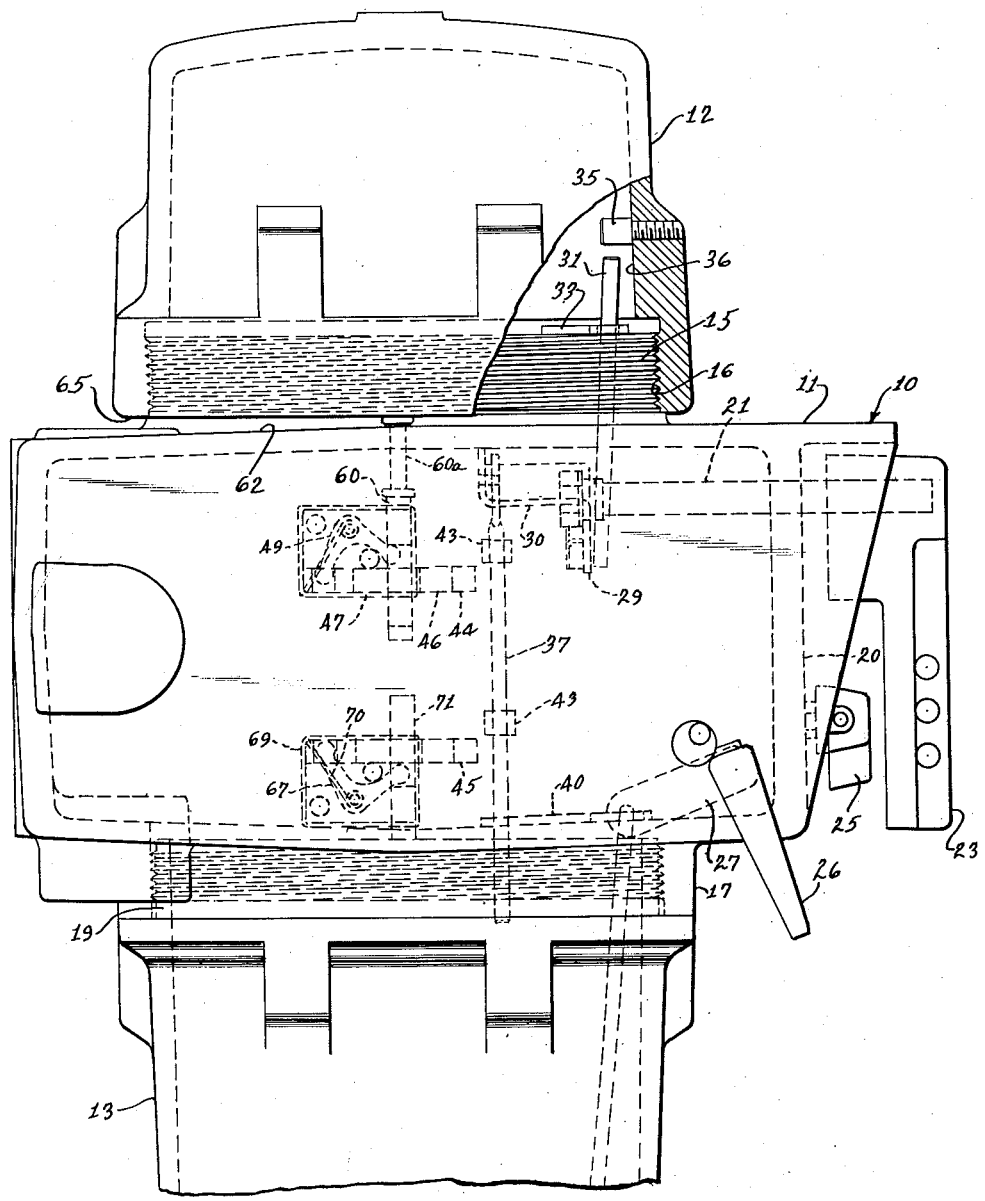
FIGURE 2 is a view in side elevation of the explosion proof enclosure shown in FIGURE 1, with a part of the upper closure member broken away and the wall thereof shown in section, in order to illustrate certain details of the interlock, preventing removal of the closure member from the enclosure except when the control member is in an "off" position.

In the embodiment of the invention illustrated in the drawings, I have shown in FIGURES 1 and 2 an explosion proof enclosure 10 which may enclose a motor starter and circuit breaker (not shown) and the like, and which includes a housing 11, herein shown as having an upper dome-like closure member 12 removably mounted thereon and a lower dome-like closure member 13 removably mounted thereon. As shown in FIGURES 1 and 2 the housing 11 has an externally threaded annular boss 15 extending upwardly therefrom upon which is threaded an inner threaded wall portion 16 of the closure member 12. The boss 15 and the internally threaded portion of the closure member 12, are of sufficient length to extinguish any flame within the housing 11 that may be caused by arcing and the combustion of any gases that may be within said housing.

The housing 11 also has a depending annular internally threaded boss 17, upon which is threaded an upwardly extending annular externally threaded boss 19, projecting upwardly from the dome-like closure member 13. The threaded portions of said bosses are also of sufficient length to extinguish any flame within the housing 11 and closure member 13.

The housing 11 has a front wall 20 having a shaft 21 rotatably mounted therein and having an "on" and "off" control member 23, herein shown as being in the form of a lever, mounted on the outer end of said shaft. The shaft 21 extends within the housing 11 for operating a circuit breaker or switch (not shown) which, in turn, allows the starter to be energized by a start and stop switch 24 to start a motor or the like (not shown). A control lever 25 can be set for either hand or automatic operation of the starter. A reset lever 26 is mounted on a side wall 27 of the housing to reset a motor starter (not shown) in a manner well known to those skilled in the art, so not herein shown or described further.

As shown in FIGURE 1 the shaft 21 has two levers 29 and 30 mounted on its inner end and extending in diametrically opposite directions. The lever 29 has an interlocking rod or plunger 31 pivotally mounted on the end thereof on a pivot pin 32, and guided in a guide plate 33 mounted on the upper end of the annular boss 15. The interlocking rod 31 extends upwardly within the dome-like closure member 12, when the lever 23 is in an "off" position and is extensibly movable within said dome-like closure 12 into the path of movement of an abutment 35, extending inwardly of an inner wall 36 of the dome-like closure 12. The rod 31 is extensibly moved within the dome-like closure 12 when the lever 23 is in its "on" position. Engagement of the abutment 35 with said interlocking rod 31 will thus prevent turning of the dome-like closure 12 in a direction to remove said dome-like closure from the housing 11.

The lever 30 in a like manner prevents relative rotation between the housing 11 and the lower dome-like closure 13, when the lever 23 is in its "on" position. Said lever has an interlocking plunger or rod 37 pivotally connected to its outer end, as by a pivot pin 39, and depending from said lever. The rod 37 is slidably guided in a guide plate 40, mounted at the lower end portion of the housing 11 and extending inwardly of the wall thereof. The interlocking rod 37 is moved from the retracted position shown in FIGURE 1 to an extended position into the path of an abutment 41, extending inwardly of an inner wall 42 of the lower dome-like closure 13, when the lever 23 is turned to an "on" position, to thereby prevent removal of the dome-like closure 13 from the housing 11, when the lever 23 is in its "on" position.

The interlocking rod 37 has spaced collars 43 secured thereto, forming interlocking collars adapted to be engaged by upper and lower yokes 44 and 45 respectively upon removal of the closures 12 and 13 from the housing 11, to thereby prevent rectilinear movement of the interlocking rod 37 and movement of the lever 23 to an "on" position, when either closure 12 or 13 is removed from the housing 11.

The yoke 44 is on the outer end of an interlocking bar 46 slidably guided in a casing 47 for a bellcrank 49, biased by a torsion spring 50 to extensibly move the bar.

As shown in FIGURE 5, the bellcrank 49 has a depending arm 51 having an engaging end portion 53 extending within a slotted opening 55 in the interlocking bar 46. The bellcrank 49 also has a generally horizontally extending lever arm 56 having an engaging end portion 57 extending within a slotted opening 59 in an interlock bar 60, slidably guided in the casing 47. The interlock bar 60 is shown in FIGURE 6 as extending along opposite sides of the interlock bar 46 to accommodate vertical movement of the interlock bar 60 with respect to the interlock bar 46. The torsion spring 50 is shown as being mounted intermediate its ends on a pivot pin 61 for the bellcrank 49 and as having a depending end portion 63 engaging within the casing 47 at a lower corner thereof, and an outwardly extending end portion 64 turned under the lever arm 56, to bias the bellcrank 49 into position to yieldably maintain the interlocking bars 46 and 60 in extended positions with respect to the housing 47.

The interlocking bar 60 abuts a plunger 60a which extends upwardly from and is slidably guided in an upper wall 62 of the housing 11, in position to be engaged by a downwardly facing rim 65 of the dome-like closure 12. Thus, when the dome-like closure 12 is in position on the housing 11, the interlocking bar 60 will be depressed to retractably move the interlocking bar 46 and yoke 44 away from the associated collar 43, and accommodate turning movement of the lever 23, and rectilinear movement of interlocking rod 37, provided the yoke 45 is also released from its associated collar 43.

It will be noted from FIGURE 2 that the spacing between the end of the yoke 44 and the associated collar 43 is sufficiently close, to prevent rectilinear movement of the interlocking plunger 37, except when the dome-like closure 12 is fully tightened on the threaded boss 15 to the extent sufficient to extinguish a flame within the housing 11 and closure 12.

The interlock for the lower closure member 13 is similar to the interlock for the upper closure member 12 and includes a bellcrank 67 pivotally mounted in a casing 69, mounted on the inner wall of the housing 11. The bellcrank 67 is inverted from the position of the bellcrank 49 and is biased by a torsion spring 70 to extensibly move the yoke 45 into the path of travel of the lower collar 43 when the housing 11 is removed from the dome-like closure 13. A rectilinearly movable interlock bar 71 is biased by the bellcrank 67 and torsion spring 70, into extended relation with respect to the bottom wall of the housing 11, when said housing is removed from the lower closure 13. This moves the yoke 45 into position to engage the lower collar 43 upon attempted movement of the lever 23, to prevent operation of the lever 23.

As the housing 11 is threaded on the threaded boss 19 of the lower closure 13, the upper end portion of said threaded boss will engage the lower end of the interlock bar 71 and effect withdrawal of the yoke 45 from the collar 43, to accommodate free operation of the lever 23, when the housing 11 is threaded on the boss 19 to its full extent of threaded movement with respect thereto, provided the upper end closure 12 is also threaded on the threaded boss 15 to its full extent of turning movement with respect to said boss.

It may be seen from the foregoing that I have provided a simple and effective interlock for an explosion proof enclosure having removable end closure members, so arranged as to prevent the turning of the electrical control devices within the enclosure to an "on" position when either or both of the closure members are removed or are not in proper position with respect to the enclosure, and to prevent the removal of either of the end closure members when the electrical control devices contained within the enclosure are in an "on" position.

While I have herein shown and described one form in which my invention may be embodied, it will be understood that various variations and modifications in the invention may be attained without departing from the spirit and scope of the novel concepts thereof, as defined by the claims appended hereto.

I claim as my invention:

1. In an interlock for motor starting devices and the like, a housing, a control member pivotally mounted on said housing on the outside thereof and a rod operated by said control member and extending within said housing, said control member being movable to "on" and "off" positions and moving said rod to effect the making and breaking of certain electrical connections, a closure mounted on said housing by rotatable movement of said closure with respect to said housing, an interlocking member guided within said housing and connected to said rod and extensibly moved with respect to said housing into interlocking engagement with said closure to prevent removal of said closure from said housing upon movement of said control member into an "on" position, a second interlocking member slidably guided in said housing and resiliently biased to project outwardly of said housing and retractibly moved with respect to said housing by said closure as said closure is placed in position on said housing, and an interlocking bar connected with said second interlocking member and biased to engage said first mentioned interlocking member and prevent movement of said control member to an "on" position upon removal of said closure from said housing, and retractibly moved with respect to said first mentioned interlocking member by retractible movement of said second interlocking member, as said second interlocking member is retractibly moved with respect to said housing as said closure is placed in position on said housing.

2. In an interlock for motor starting devices and the like, a housing, a control member pivotally mounted on said housing on the outside thereof and a rod operated by said control member and extending within said housing, said control member being movable to "on" and "off" positions and moving said rod to effect the making and breaking of certain electrical connections, a closure mounted on said housing by rotatable movement of said closure with respect to said housing, an interlock member guided within said housing and connected to said rod and extensibly moved with respect to said housing into interlocking engagement with said closure, to prevent removal of said closure from said housing upon movement of said control member into an "on" position, a second interlocking member slidably guided in said housing and resiliently biased to project outwardly of said housing and retractably moved with respect to said housing by said closure as said closure is placed in position on said housing, and a third interlock member biased to have interlocking connection with said rod when said second interlocking member is extended with respect to said housing and retracted out of interlocking connection with said rod upon retractable movement of said second interlocking member by engagement with said closure and mounting of said closure on said housing.

3. An interlock for motor starting devices and the like comprising a housing having removable closures on opposite ends thereof, a control member pivotally mounted on said housing on the outside thereof and a rod operated by said control member and extending within said housing and effecting the making and breaking of certain electrical connections upon movement of said control member to "on" and "off" positions, two interlocking members connected with said rod and extensibly moved with respect to said housing by said rod upon movement of said control member to an "on" position, and abutment means within said closures engaged by said interlock members and locking said closures from removal from said housing when said lever is in an "on" position.

4. An interlock for motor starting devices and the like comprising a housing having removable closure on opposite ends thereof, a control member pivotally mounted on said housing on the outside thereof and a rod operated by said control member and extending within said housing and effecting the making and breaking of certain electrical connections upon movement of said control member to "on" and "off" positions, two interlocking members connected with said rod and extensibly moved with respect to said housing by said rod upon movement of said control member to an "on" position, abutment means within said closures engaged by said interlock members and locking said closures from removal from said housing when said lever is in an "on" position, and other interlocking means preventing operation of said control member to an "on" position except when said colosures are in position on said housing, comprising second interlocking members baised to extend from said housing and retractably moved with respect to said housing by engagement with said closures and the placing of said closures thereon, and third interlocking members associated with said second interlocking members and having interlocking connection with said rod upon extensible movement of said second interlocking members and retracted from interlocking connection with said rod upon retractable movement of said second interlocking members and the securing of said closures to said housing.

5. An interlock for motor starting devices and the like comprising a housing having removable closures on opposite ends thereof, a control member pivotally mounted on said housing on the outside thereof and a rod operated by said control member and extending within said housing and effecting the making and breaking of certain electrical connections upon movement of said control member to "on" and "off" positions, two interlocking members connected with said rod and extensibly moved with respect to said housing by said rod upon movement of said control member to an "on" position, abutment means within said closures engaged by said interlock members and locking said closures from removal from said housing when said lever is in an "on" position, and other interlocking means preventing operation of said control member to an "on" position except when said closures are in position on said housing, comprising second interlocking members biased to extend from said housing and retractably moved with respect to said housing by engagement with said closures and the placing of said closures thereon, and third interlocking members associated with said second interlocking members and having interlocking connection with said rod upon extensible movement of said second interlocking members and retracted from interlocking connection with said rod upon retractable movement of said second interlocking members and the securing of said closures to said housing, the interlocking connection between said second and third interlocking members and said rod including a common interlocking connection between said third interlocking members and one of said first mentioned interlocking members, preventing movement of said associated first mentioned interlocking member and the turning of said control member to an "on" position upon removal of either closure from said housing.

References Cited in the file of this patent
UNITED STATES PATENTS

| | | |
|---|---|---|
| 1,798,244 | Woodworth | Mar. 31, 1931 |
| 2,194,549 | Hardage | Mar. 26, 1940 |
| 2,284,613 | Hyde | May 26, 1942 |